Sept. 7, 1948.  J. T. LAWRENCE  2,448,895
COLLAPSIBLE HOUSE

Filed April 25, 1945  7 Sheets-Sheet 1

Inventor
JOHN T. LAWRENCE

By Randolph & Beavers
Attorney

Sept. 7, 1948. J. T. LAWRENCE 2,448,895
COLLAPSIBLE HOUSE
Filed April 25, 1945 7 Sheets-Sheet 3

Inventor
JOHN T. LAWRENCE

By Randolph & Beavers
Attorney

Sept. 7, 1948.  J. T. LAWRENCE  2,448,895
COLLAPSIBLE HOUSE

Filed April 25, 1945  7 Sheets-Sheet 4

Inventor
JOHN T. LAWRENCE
By Randolph & Beavers
Attorney

Sept. 7, 1948.    J. T. LAWRENCE    2,448,895
COLLAPSIBLE HOUSE

Filed April 25, 1945    7 Sheets-Sheet 5

Inventor
JOHN T. LAWRENCE

By Randolph & Beavers
Attorney

Sept. 7, 1948.  J. T. LAWRENCE  2,448,895
COLLAPSIBLE HOUSE

Filed April 25, 1945  7 Sheets-Sheet 6

Inventor
JOHN T. LAWRENCE
By Randolph & Beavers
Attorney

Sept. 7, 1948.　　　J. T. LAWRENCE　　　2,448,895
COLLAPSIBLE HOUSE

Filed April 25, 1945　　　　　　　　　　　　7 Sheets-Sheet 7

Inventor
JOHN T. LAWRENCE
By Randolph & Beavers
Attorney

Patented Sept. 7, 1948

2,448,895

UNITED STATES PATENT OFFICE 2,448,895

COLLAPSIBLE HOUSE

John T. Lawrence, Inman, S. C.

Application April 25, 1945, Serial No. 590,132

7 Claims. (Cl. 135—1)

This invention relates to houses and more particularly to dwelling houses of collapsible or knock-down construction.

The principal object of this invention is to provide a collapsible house which is especially designed to be quickly assembled and disassembled, so that in emergencies, a number of these structures can be readily set up for use by families whose homes have been destroyed or for other reasons do not have living quarters available.

Another important object of the invention is to provide a collapsible house which can be used during war times as temporary quarters for unfortunate families who have been bombed or otherwise displaced from their homes or who have been evacuated or otherwise deprived of their homes.

Still another important object of the invention is to provide a readily collapsible or knock-down house which can be quickly assembled and which can be used during normal times as a temporary or even long time beach dwelling or camp dwelling.

Still a further object of the invention is to provide a collapsible or knock-down house of the character stated which can be folded or otherwise reduced to a small package easily capable of being stored in the luggage compartment of a present day automobile.

These and various other important objects and advantages of the invention shall become apparent to the reader of the following description.

Referring to the drawings wherein like numerals designate like parts, it can be seen that the assembly includes a base frame composed of a hub plate or block 5 having a plurality (preferably four) of arms 6 radiating therefrom and hinged thereto as at 7. These arms 6 extend toward the four corners of the house and at their outer ends coact with vertical props 8. The props 8 are notched at their lower ends as at 9 to straddle the outer ends of the arms 6, while their upper ends are notched as at 10 to straddle the lower ends of hinged rafters 11 which form part of the upper frame of the house.

The upper frame assembly includes a centrally located head or hub plate 12 to which the upper ends of the rafters 11 are hinged as at 13. Cleats 14 extend across the top of the hub plate 12 and this plate has an opening therein across which a pin 15 is disposed and from which a rope or other suspending medium 16 is secured. If desired the pin 15 can bridge the cleats 14 and the rope or other suspending medium 16 depend through the opening in the hub plate 12.

Figure 1:
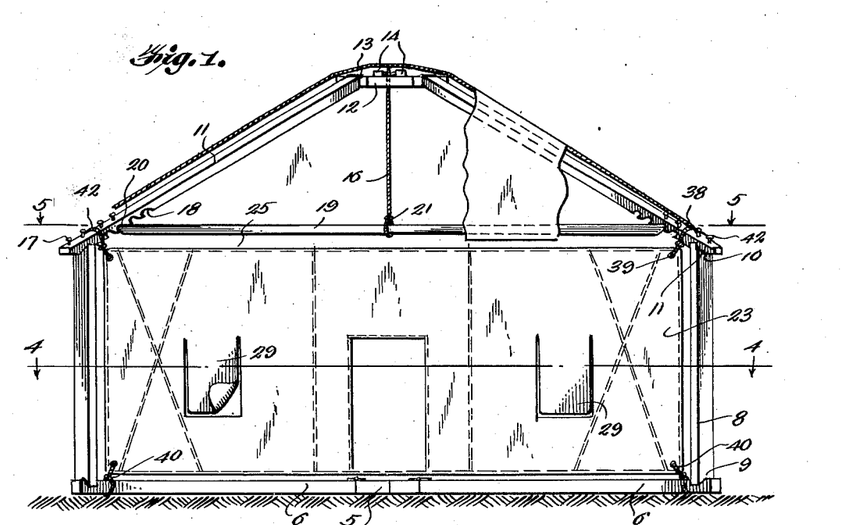
Figure 1 is a side elevational view of the assembled house with the roof forming cover broken away.
Figures 3, 8, 12:
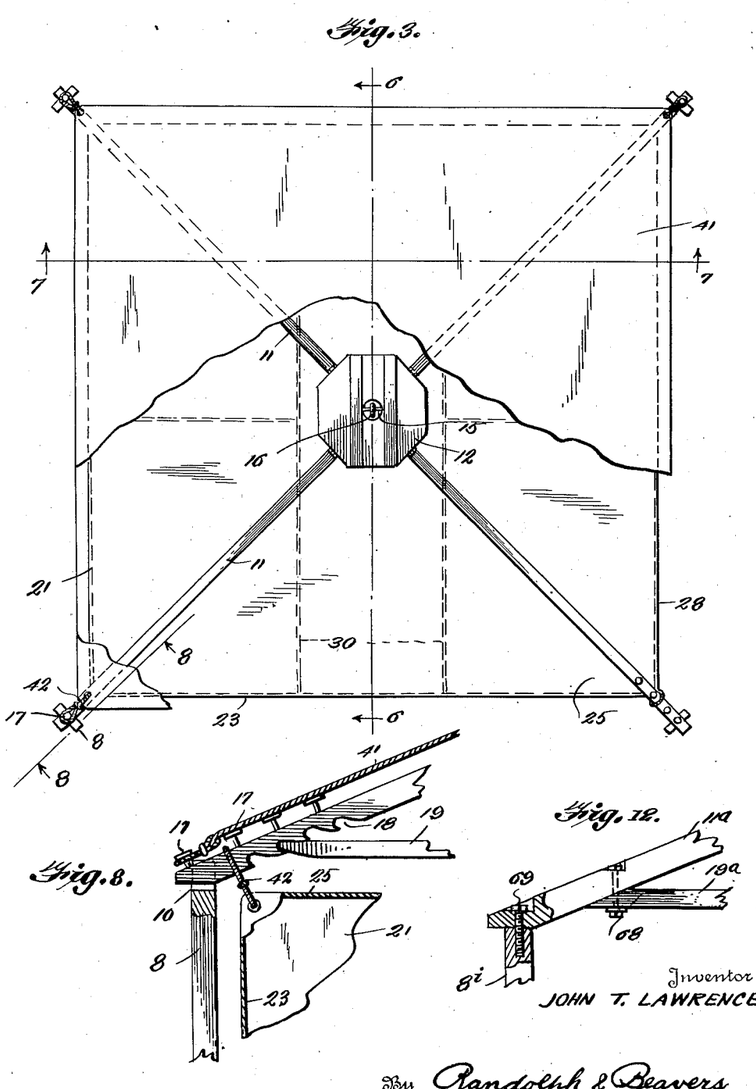
Figure 3 is a top plan view with a portion of the cover broken away.
Figure 8 is an enlarged fragmentary detailed sectional view taken on line 8—8 of Figure 3.
Figure 12 is a fragmentary detailed sectional view showing the manner in which the rafters and spreaders may be secured by way of modification.
Figure 4:
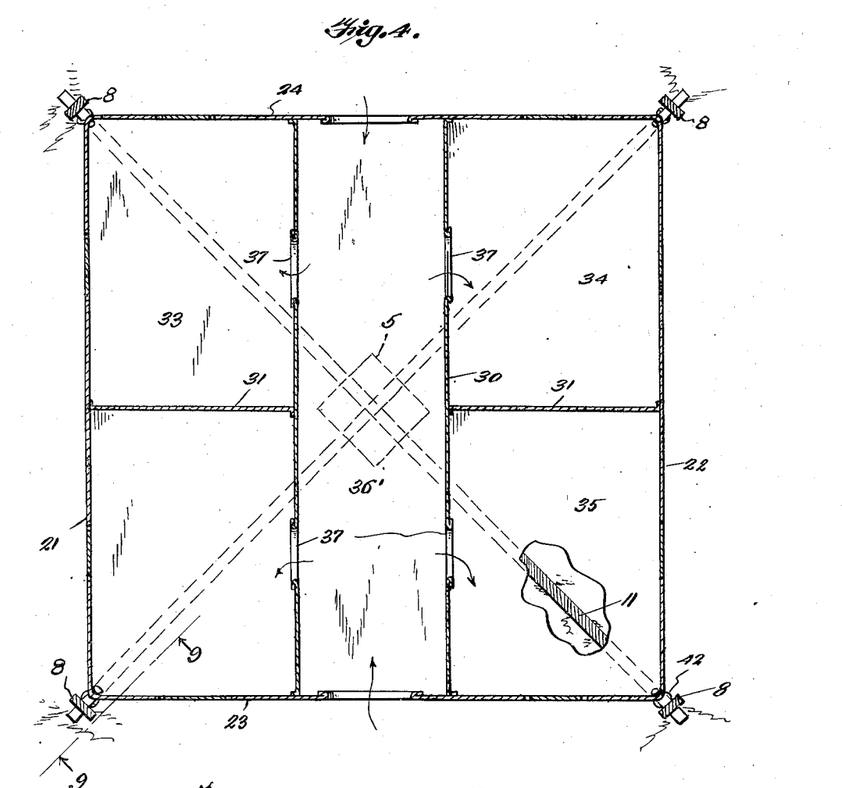
Figure 4 is a horizontal sectional view taken on line 4—4 of Figure 1.

At the lower top portion of the rafters 11 are longitudinally spaced headed studs 17 and on the lower under side portions of these rafters 11 are notches 18 obliquely disposed as in the manner substantially shown in Figures 1 and 8 so that they will assume a substantially horizontal position when the rafters 11 are in assembled or inclined position as shown in Figure 1.

A pair of crossed spreaders 19 are interposed between the lower ends of the rafters 11, the ends of the spreaders 19 being tapered or bevelled as at 20 to snugly fit into the corresponding notches 18. To get the desired taut holding effect, the desired notches can be selected. Where the spreaders 19 cross, the suspending medium or rope 16 is preferably looped around as at 21 and suitably secured, thus tying the upper or super frame with the spreaders 19.

Figures 5, 10, 11:
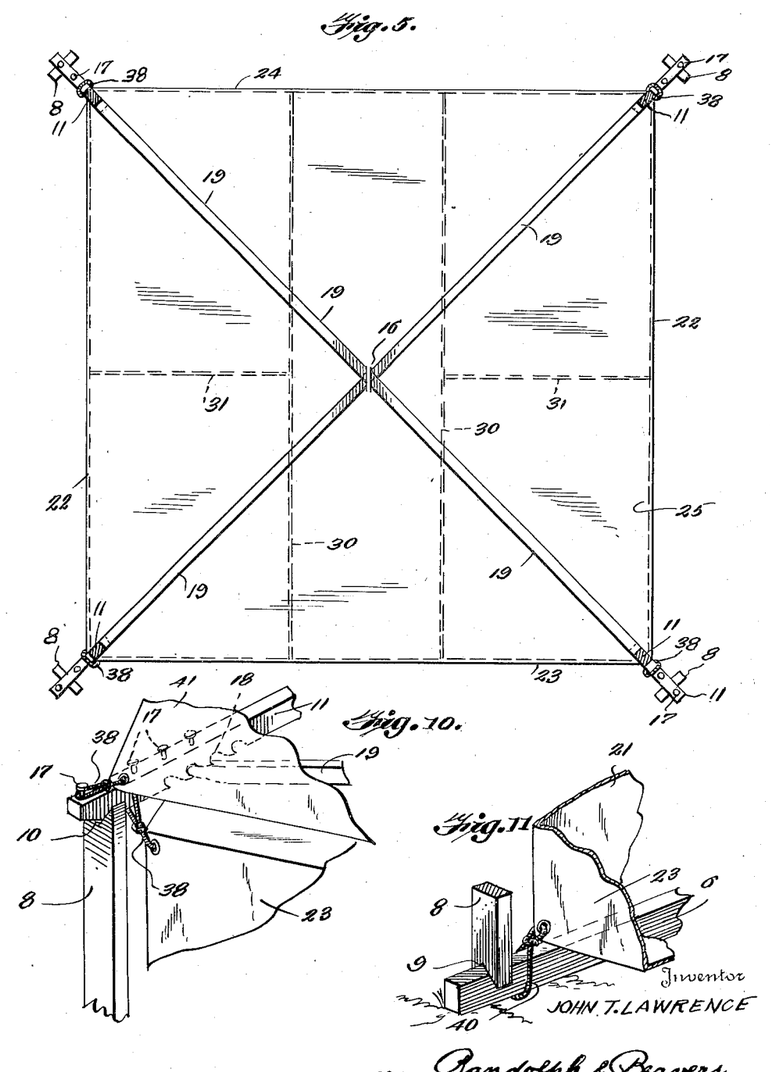
Figure 5 is a horizontal sectional view taken on line 5—5 of Figure 1.
Figure 10 is a fragmentary detailed perspective view showing one upper corner of the assembly.
Figure 11 is a fragmentary detailed perspective view showing one lower corner of the assembly.
Figure 6:
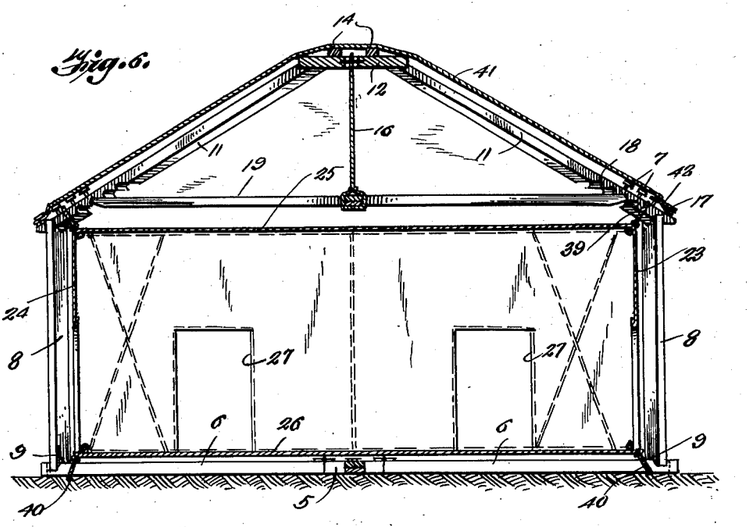
Figure 6 is a vertical sectional view taken on line 6—6 of Figure 3.
Figure 7:
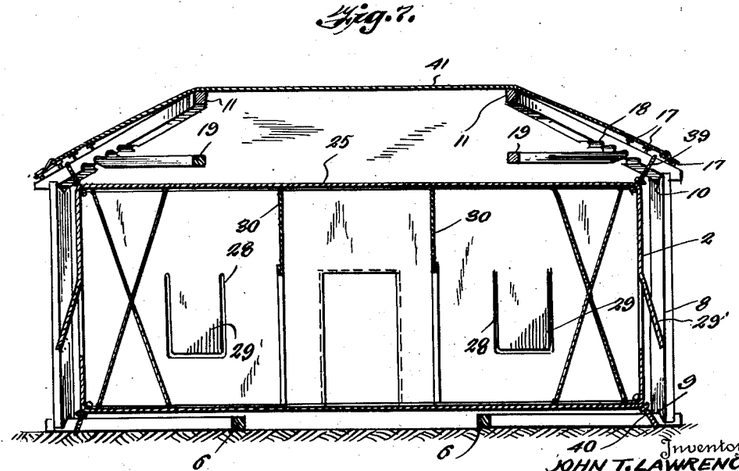
Figure 7 is a transverse vertical sectional view taken on line 7—7 of Figure 3.
Figures 9, 13:
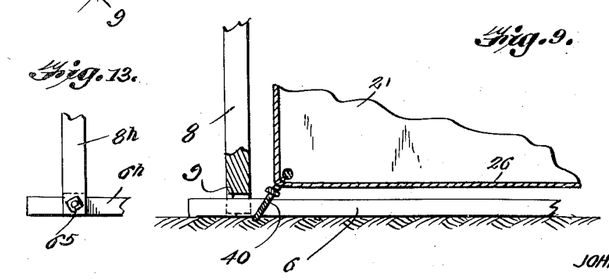
Figure 9 is a fragmentary enlarged detailed sectional view taken on line 9—9 of Figure 4.
Figure 13 is a fragmentary elevational view showing securing means for the corner posts.

As can be clearly seen in Figures 1 and 10, the lower portion of each of the rafters 11 is preferably tapered at its lower side and rests in the notch at the upper end of the corresponding prop 8. Also see Figure 8.

The wall construction of the house consists of sidewalls 21, 22, a front wall 23 and a rear wall 24. This wall assembly also has a top wall or ceiling 25 underlying the spreaders 19. It may be desirable to have a flexible floor 26, although this may be a platform built over the frame arms 6, if desired.

The vertical walls have a suitable number of door openings 27 and window openings 28. The window openings may have window flaps 29 whereby these openings may be closed, or these openings may be provided with demountable frames for holding screens or screening material.

It is preferable that the interior of the wall structure have partitions 30 and other partitions 31 dividing the interior into various rooms 32, 33, 34 and 35 on opposite sides of a hallway or the like 36. Various door openings 37 may be provided in the inside walls 30.

Tie members 38 are disposed through grommets or eyes 39 in the upper corners of the wall assembly and these are disposed over the lower ends of the rafters 11 and between certain of the studs 17 provided thereon. Thus the wall assembly is suspended from the lower ends of the rafters 11.

The lower portion of the wall assembly is held down by tie members or cords 40 which extend through eyes or grommets in the corners of the wall assembly and pass down under the outer ends of the lower frame arms 6.

A cover sheet also of some suitable material such as waterproofed canvas and denoted by numeral 41 is disposed over the super frame, being supported by the rafters 11 and the hub plate 12. This cover 41 extends down to substantially overlap the vertical walls of the wall assembly and has loops 42 at its corner portions which are disposed over the endmost headed studs 17, thus definitely securing the protective cover 41 from displacement.

In assembling the house, the lower or base frame is unfolded and laid out on the ground with the arms 6 extended. The wall assembly is now disposed over this frame and the lower ties 40 secured to the outer ends of the arms 6, as in the manner substantially shown in Figure 11.

The super frame is now spread out over the collapsed wall assembly and over this can be temporarily placed, the spreaders 19.

One of the rafters 11 is now lifted over a corresponding arm 6, and a prop 8 interposed between the outer ends of the rafter and arm, after which a diagonally opposite rafter can be lifted and another prop interposed between its outer end and the underlying arm 6. This is repaired with the remaining two props and while being held, the spreaders 19 are interposed between the rafters 11, the same having their tapered ends 20 disposed into selected notches 18 of the rafters, for the purpose of thus spreading the assembly. It is preferable that the ties 38 be disposed over the lower ends of the rafters 11 before this spreading operation, because the use of the spreaders 19 serves to draw the entire structure taut and prevents any shimmying or vibration. This will draw the various walls of the wall assembly taut, so that screens may be placed in the doors and window openings.

Figure 2:
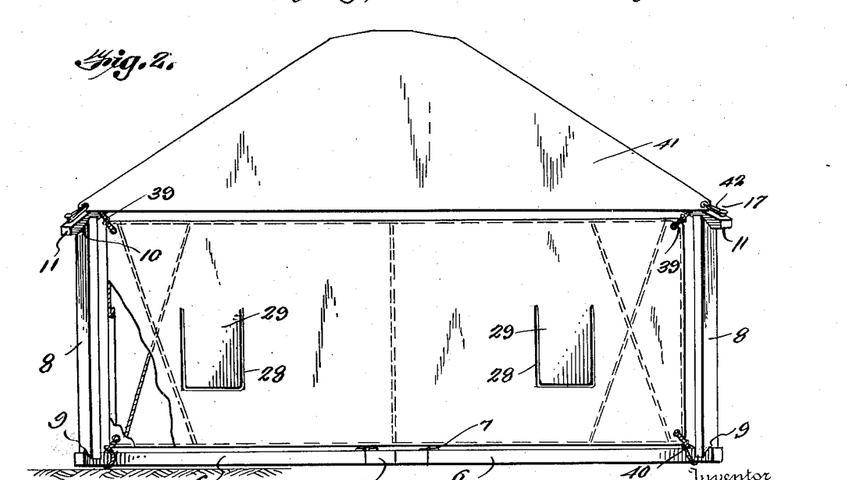
Figure 2 is a side elevational view of the house.

The cover 41 is now disposed over the super frame, down over the rafters 11 and the loops 42 are pulled and stretched over the selected studs 17 as shown in Figure 2.

It is preferable that the cover sheet 41 and the wall assembly be constructed of rubberized canvas or canvas or other fabric or in fact any other flexible sheet material that will shed or exclude water and other inclement weather conditions.

It may be desirable to provide some carrier bag or wrapping for the collapsed building, but this may be constructed to accommodate the peculiarities of the compacted structure.

It may be that later, such materials as plastics may be employable instead of wood in the construction of the framework.

It is desirable that no nails or other driven elements be employed in the setting up or knocking down of the structure. It may become necessary to employ latches and eyes or other fastening means for certain parts, but it is thought that the structure as represented above will not only be durable but sturdy in all conditions of weather, especially under windy conditions, due to the flexible make-up of the entire structure.

History has also established that after wars when people have accepted more or less packed living conditions, the tendency is to expand and housing becomes more of a problem than actually during war times. Then most people have the inclination to seek suburban environments, especially beaches and other isolated places. This natural expansion can be even promoted with a housing construction such as is herein disclosed.

Figures 21, 22:
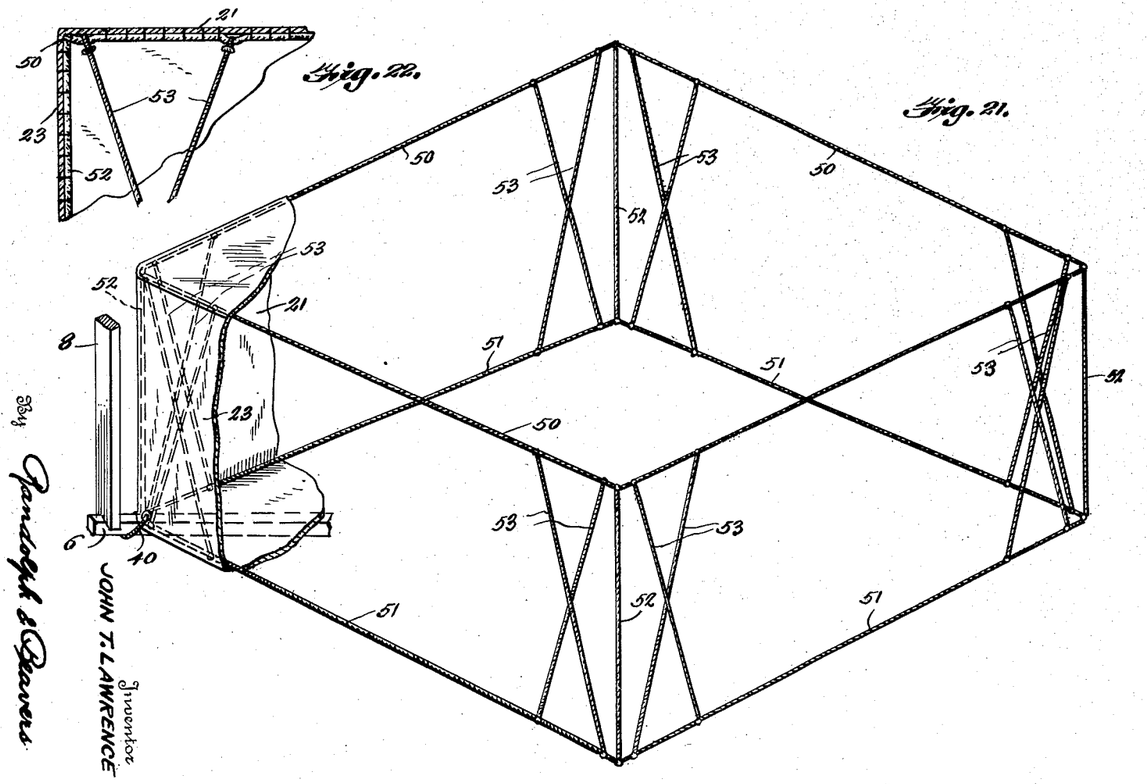
Figure 21 is a perspective view of the rope framework.
Figure 22 is a fragmentary vertical sectional view through one corner portion of the canopy to show the rope framework.

Figure 21 discloses the skeleton or rope frame for the wall structure, this frame consisting of upper and lower rope flights 50, 51 which extend around the perimeter of the house and over which the top, side and bottom walls extend, these flights 50, 51 being connected at their corners by vertical rope sections 52 and adjacent the corners, the flights 50, 51 are braced by vertically disposed and crossed rope sections 53. Obviously the corner rope sections 52 in complement with the crossed bracing rope sections 53 serve to stabilize the frame and to definitely define a given form predetermined by the builder.

Obviously various other modifications of this rope framework can be resorted to as conditions justify.

The base or subframe 5, 6 may be dispensed with if corner post retention means such as is shown in Figures 14 to 20 inclusive are resorted to.

Figure 14:
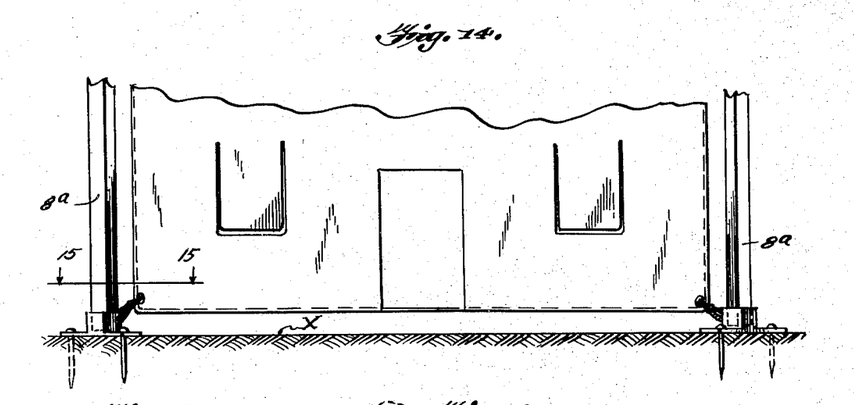
Figure 14 is a fragmentary elevational view showing ground sockets for the corner posts.
Figure 15:
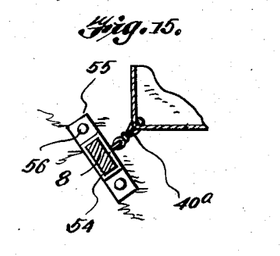
Figure 15 is a section taken on line 15—15 of Figure 14.
Figures 16, 19:
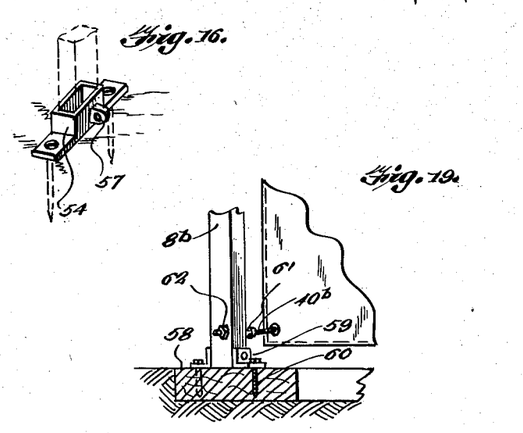
Figure 16 is a perspective view of one of the post sockets.
Figure 19 is a fragmentary detailed sectional view showing a further form of post fastening means.

For instance, Figures 14, 15 and 16 show a socket 54 having lateral apertured ears 55 through which stakes 56 are driven and into the ground X (see Figure 14), the socket 54 being adapted to snugly receive the lower end of a corresponding corner post 8a, there being four of these posts for a medium sized square house. Each of these sockets 54 has an eye 57 through which a tie cord 40a is disposed for holding down the lower adjacent corner of the wall structure (see Figure 14 and also Figure 15).

A ground embedded frame 58 of wood or some other suitable material may have corner posts 8b resting thereon and secured thereto by angle members 59, which are apertured to receive screws 60 driven both into the wooden frame 58 and the lower portion of the corresponding post 8b. An eyebolt 61, equipped with a nut 62 may be disposed through the lower portion of the post 8b to define an anchor for a tie cord 40b, as shown in Figure 19.

Figure 17:
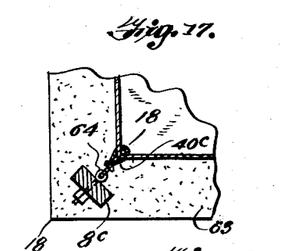
Figure 17 is a fragmentary sectional view showing a corner post held in concrete.
Figure 18:
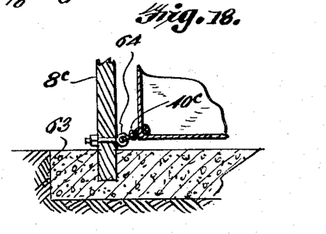
Figure 18 is a section taken on line 18—18 of Figure 17.

A third means for eliminating the sub or base frame structure is shown in Figures 17 and 18 wherein the lower portion of a corner post 8c is embedded in a concrete ground inlaid foundation 63, this corner post being provided with an eyebolt 64 to accommodate a tie cord 40c.

Figure 20:
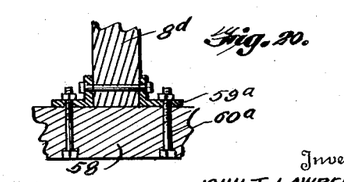
Figure 20 is a fragmentary detailed sectional view of a post fastening means slightly modified over Figure 19.

A further form is shown in Figure 20, wherein bolts 60a may be used in conjunction with angle members 59a to secure the angle members to a ground inlaid wooden frame 58, the upper portions of the elements 59a being secured to the lower portion of the corresponding post 8d.

Thus it can be seen that the foregoing means of securing the lower ends of the corner posts in place eliminate the use of any ground framework underlying the house proper to the end that the ground itself may be used as the floor for the building.

Another factor to be given consideration is that to hold the corner post 8h firmly to the members 6h of the ground frame and to any other members of the ground or sub frame that may be employed, bolts 65 pass through the post and the end portions of the members of the sub frame.

As can be seen in Figure 10, the bars 19, their ends, fit into notches 18 of the rafters 11. Of course, these spreaders or bars 19 may be tied to the rafters 11 or bolted thereto as seen fit.

Figure 12 shows how spreaders 19a may be secured to rafters 11a, this by bevelling the ends of the spreaders and securing the same against the rafters 11a by bolts 68. Further, the ends of the rafters 11a may rest directly upon the upper ends of corner posts 8i where they are secured by screws 69.

While the foregoing description sets forth the invention in specific terms, it is to be understood that numerous changes in the shape, size and materials may be resorted to without departing from the spirit and scope of the invention as claimed hereinafter.

Having described the invention what is claimed as new is:

1. A collapsible house comprising a flexible wall assembly, an elevated supporting frame and means supporting the wall assembly by the elevated frame, said supporting frame consisting of a hub and a plurality of hinged rafters, a base structure, prop means between the base structure and the rafters and tie means between the flexible wall assembly and the rafters, and a spreader interposed between the rafters, said rafters being provided with notches for receiving the ends of the spreader.

2. A collapsible house comprising a flexible wall assembly, an elevated supporting frame and means supporting the wall assembly by the elevated frame, said supporting frame consisting of a hub and a plurality of hinged rafters, a base structure, prop means between the base structure and the rafters and tie means between the flexible wall assembly and the rafters, and a spreader interposed between the rafters, said rafters being provided with notches for receiving the ends of the spreader, said hub structure of the supporting frame provided with a depending element secured to the intermediate portion of the spreader.

3. A collapsible house comprising a roof frame, said roof frame comprising a hub portion and radially disposed rafters, a base frame, a flexible side wall structure having some elasticity and being secured at its upper and lower corner portions to the outer ends of the rafters and base frame respectively, posts interposed between the outer ends of the base frame and the outer ends of the rafters for supporting the roof frame and holding the side wall structure vertically taut and a canopy for the roof frame.

4. A collapsible house comprising a roof frame, said roof frame comprising a hub portion and radially disposed rafters, a base frame, a flexible side wall structure having some elasticity and being secured at its upper and lower corner portions to the outer ends of the rafters and base frame respectively, posts interposed between the outer ends of the base frame and the outer ends of the rafters for supporting the roof frame and holding the side wall structure vertically taut and a canopy for the roof frame, and a spreader structure having portions interposed between the end portions of the rafters.

5. A collapsible house comprising a roof frame, said roof frame comprising a hub portion and radially disposed rafters, a base frame, a flexible side wall structure having some elasticity and being secured at its upper and lower corner portions to the outer ends of the rafters and base frame respectively, posts interposed between the outer ends of the base frame and the outer ends of the rafters for supporting the roof frame and holding the side wall structure vertically taut, a canopy for the roof frame, and a spreader structure having portions interposed between the end portions of the rafters, said spreader being provided with a tie connection between its intermediate portion and the hub structure of the roof frame.

6. A collapsible house comprising a roof frame, said roof frame comprising a hub portion and radially disposed rafters, a base frame, a flexible side wall structure having some elasticity and being secured at its upper and lower corner portions to the outer ends of the rafters and base frame respectively, posts interposed between the outer ends of the base frame and the outer ends of the rafters for supporting the roof frame and holding the side wall structure vertically taut and a canopy for the roof frame, the outer end portions of the rafters being formed with longitudinally spaced notches, crossed members defining a spreader structure, the ends of the crossed members being disposed in the notches, some give being allowed by the roof frame rafters due to the flexible and elastic nature of the side wall structure.

7. A collapsible house comprising a roof frame, said roof frame comprising a hub portion and radially disposed rafters, a base frame, a flexible side wall structure having some elasticity and being secured at its upper and lower corner portions to the outer ends of the rafters and base frame respectively, posts interposed between the outer ends of the base frame and the outer ends of the rafters for supporting the roof frame and holding the side wall structure vertically taut, a canopy for the roof frame, the outer end portions of the rafters being formed with longitudinally spaced notches, crossed members defining a spreader structure, the ends of the crossed members being disposed in the notches, some give being allowed by the roof frame rafters due to the flexible and elastic nature of the side wall structure, and a tie connection between the crossed portions of said spreader members and the hub portion of the roof frame.

JOHN T. LAWRENCE.

REFERENCES CITED

The following references are of record in the file of this patent:

UNITED STATES PATENTS

| Number | Name | Date |
| --- | --- | --- |
| 413,730 | Palmer | Oct. 29, 1889 |
| 673,327 | Reeve | Apr. 30, 1901 |
| 1,374,300 | Henry | Apr. 12, 1921 |
| 1,633,820 | Long | June 28, 1927 |
| 1,827,729 | Brooks | Oct. 20, 1931 |
| 1,828,656 | Handler | Oct. 20, 1931 |
| 2,311,516 | Bridge | Feb. 16, 1943 |